(12) United States Patent
Povirk et al.

(10) Patent No.: US 8,109,853 B2
(45) Date of Patent: *Feb. 7, 2012

(54) CONTROL OF A LOCKING DIFFERENTIAL

(75) Inventors: Jacob M. Povirk, Franklin, MI (US);
Joseph J. Torres, Dearborn, MI (US);
Brian J. Andonian, Plymouth, MI (US);
Jihong Guo, Ann Arbor, MI (US);
Patrick Meloche, Northville, MI (US);
Kenneth G. Walega, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 309 days.

This patent is subject to a terminal disclaimer.

(21) Appl. No.: 12/419,424

(22) Filed: Apr. 7, 2009

(65) Prior Publication Data
US 2010/0255947 A1  Oct. 7, 2010

(51) Int. Cl.
*F16H 48/20* (2012.01)
*F16H 48/30* (2012.01)

(52) U.S. Cl. ................ 475/150; 475/231; 475/249

(58) Field of Classification Search .................. None
See application file for complete search history.

(56) References Cited

U.S. PATENT DOCUMENTS

| 4,860,208 A | 8/1989 | Bantle |
| 4,989,686 A | 2/1991 | Miller et al. |
| 5,079,708 A | 1/1992 | Brown |
| 5,899,951 A | 5/1999 | Babbel et al. |
| 6,083,134 A * | 7/2000 | Godlew ................. 475/231 |
| 6,105,702 A | 8/2000 | Showalter |
| 6,183,389 B1 * | 2/2001 | Tabata ................. 477/5 |
| 6,517,464 B2 * | 2/2003 | Yamazaki et al. .......... 477/5 |
| 6,604,041 B2 | 8/2003 | Hessmert et al. |
| 7,175,557 B2 | 2/2007 | Kirkwood et al. |
| 7,211,020 B2 * | 5/2007 | Gohl et al. ............... 475/231 |
| 7,325,664 B2 * | 2/2008 | Fusegi .................. 192/84.92 |
| 7,356,401 B2 | 4/2008 | Romer et al. |
| 7,357,749 B2 * | 4/2008 | Nofzinger et al. .......... 475/231 |
| 7,395,891 B2 | 7/2008 | Barrette et al. |
| 7,399,248 B2 * | 7/2008 | Kleinhans et al. ......... 475/236 |
| 7,421,327 B2 | 9/2008 | Romer et al. |
| 7,553,255 B2 * | 6/2009 | Torres et al. ............. 477/35 |
| 2005/0070393 A1 * | 3/2005 | DeGowske et al. ........ 475/220 |
| 2006/0240931 A1 * | 10/2006 | Habel .................... 475/150 |
| 2006/0270512 A1 * | 11/2006 | Pinkos .................. 475/231 |
| 2008/0004783 A1 | 1/2008 | Mizon et al. |
| 2008/0242464 A1 * | 10/2008 | Kumazaki et al. ......... 475/136 |
| 2010/0256879 A1 * | 10/2010 | Povirk et al. ............ 701/51 |

* cited by examiner

*Primary Examiner* — David D Le
*Assistant Examiner* — Lillian Nguyen
(74) *Attorney, Agent, or Firm* — David B. Kelley, Esq.; MacMillan, Sobanski & Todd, LLC

(57) ABSTRACT

A method for controlling a locking differential for a vehicle includes using a coil to unlock the differential, if the vehicle stops for a period whose length is equal to or greater than a reference length, and using the coil to lock the differential, if the vehicle is moving or stopped for less than the reference length.

15 Claims, 4 Drawing Sheets

CONTROL OF A LOCKING DIFFERENTIAL

BACKGROUND OF THE INVENTION

1. Field of the Invention

The invention relates generally to a differential mechanism, which transmits rotating power to the wheels of a motor vehicle and locks to prevent the wheels from rotating at different speeds.

2. Description of the Prior Art

It is conventional to use an open or limited slip differential mechanism to permit limited wheel slip at a vehicle axle, i.e., to produce a rotational speed difference between the driven wheels. A purpose of a locking differential is to prevent relative rotation of one driven wheel with respect to another driven wheel. This is usually accomplished by locking one differential side gear to a differential case, thereby preventing rotation of the side gear with respect to the differential case, and preventing relative wheel speed differentiation across any one axle.

A locking differential can also be used as an inter-wheel differential or as a center differential in 4×4 and AWD vehicles. In this case, the axis of the differential assembly is parallel to the longitudinal axis of the vehicle. The center differential allows drive shaft speed differences between the front and rear axles. But there are some cases where it is desired to lock the front and rear axle drive shafts together such that a single rotation speed is re attained. This condition is known as a locked center differential.

When activated, an electronically locking differential uses a voltage source to produce a magnetic force that overcomes a reactionary spring force applied to a locking ring (mechanical engagement mechanism), thereby mechanically coupling a side gear to a differential case through the lock ring. When activated, the electronic locking differential prevents relative speed differences between the controlled wheels.

A need exists in the industry for a control that prevents locking the differential when the coil may be overheated due to lack of contact with a cooling medium while the vehicle is stationary. The control would enable the differential to be locked whenever the vehicle is moving provided the gear selector is in other than a neutral or park position.

SUMMARY OF THE INVENTION

A method for controlling a locking differential for a vehicle includes using a coil to unlock the differential, if the vehicle stops for a period whose length is equal to or greater than a reference length, and using the coil to lock the differential, if the vehicle is moving or stopped for less than the reference length.

The invention contemplates a system for controlling the locking differential. The system includes a mechanism for locking and unlocking the differential in response to operative states of an actuator coil, and a controller configured to determine if the vehicle is moving or stopped, to actuate the coil and unlock the differential, if the vehicle stops for a period whose length is equal to or greater than a reference length; and to actuate the coil and lock the differential, if the vehicle is moving or stopped for less than the reference length.

The control system avoids the possibility of attempting to lock the differential using an actuating voltage that is too low for that purpose. The temperature compensation ensures that the magnetic force produced by an electric coil is great enough to cause clutch teeth on a locking plate to engage clutch teeth on a side gear and to lock the differential. When the vehicle is stationary, disengagement of the electronic locker lowers the electrical load on the alternator and battery and prevents overheating of the coil and possible breakdown of its insulation.

The temperature compensation prevents potential hardware damage due to partial engagement of the clutch teeth on the locking ring with those on the side gear.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
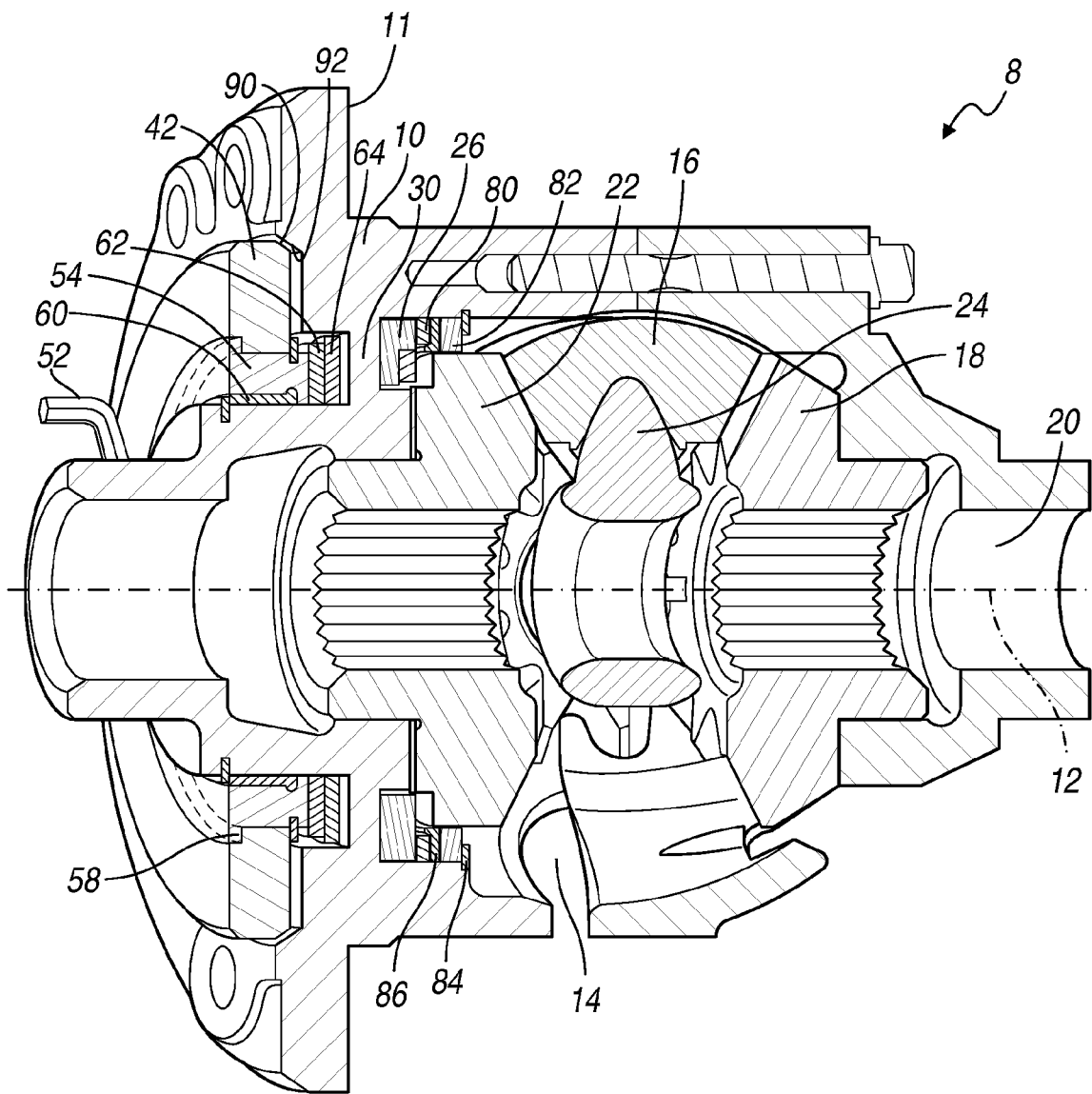
FIG. 1 is a perspective cross section of an electronic locking differential mechanism.
Figure 2:
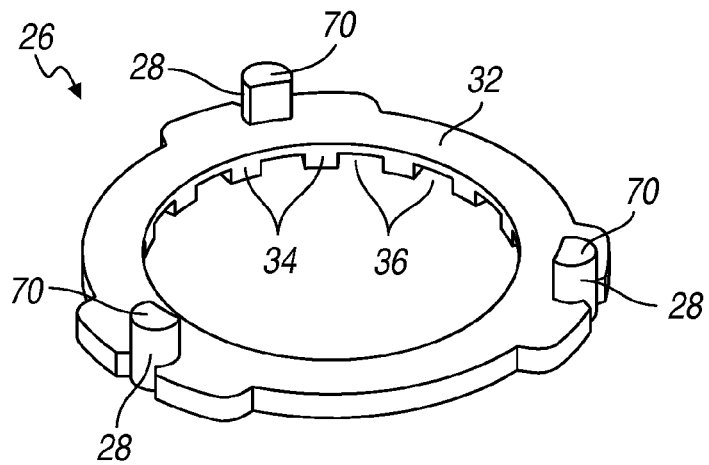
FIG. 2 is an isometric view of a locking ring.

Referring to FIGS. 1-4, an electronic locking differential 8 includes a differential case 10, preferably of cast iron or steel, supported on a stationary housing (not shown) for rotation about a lateral axis 12. A bevel ring gear, secured to the case at the attachment bole holes on the flange 11, drives the case 10 in rotation about axis 12 from an output of a transmission or transfer case.

The case 10 provides an internal chamber 14, which contains bevel pinions 16, a right side gear 18 meshing with the pinions and driveably connected to a right output shaft 20, which extends from the case 10 to a driven wheel of a motor vehicle, and a left side gear 22 meshing with the pinions and driveably connected to a left output shaft (not shown), which extends from the case to a driven wheel at the left side. The pinions 16 are each secured by pins 24 to the rotating case 10, such that the pinions 16 rotate about the axis of pins 24 perpendicular to axis 12, and the pinions and pins 24 rotate about axis 12.

Also located in the case 10 is a locking ring 26, secured to the case such that it rotates about axis 12 and moves axially relative to the case along the axis. The ring 26 is formed with three posts 28, each post extending axially through a hole in web 30, which is formed in the case 10; a planar surface 32 facing the web 30; and a series of clutch teeth 34 and spaces 36 angularly arranged alternately about axis 12 on the axially opposite side of the locking ring from surface 32. The clutch teeth and spaces are adjacent and face the side gear 22.

The side gear 22 is formed with a series of clutch teeth 38 and spaces 40, the teeth 38 angularly arranged alternately about axis 12 on its axial outer face adjacent the clutch teeth 34 and spaces 36 of the locking ring 26. The clutch teeth and spaces of the side gear 22 and locking ring 26 are mutually complementary such that they can engage and disengage as the locking ring moves toward and away from the side gear. The locking ring 26 is normally not engaged with the side gear 22 and permits the side gear to rotate with respect to the differential case 10 and the locking ring, thereby producing an unlocked or disengaged state.

When the locking ring 26 is actuated to engage the side gear 22, their clutch teeth and spaces mesh, thereby driveably connecting the side gear to the locking ring and case 10, preventing the side gear from rotating relative to the case and locking ring, and producing a locked or engaged state.

Figure 4:
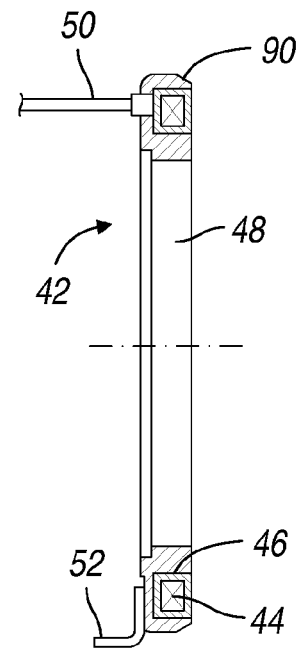
FIG. 4 is a side view of a field core coil assembly.
Figure 3:
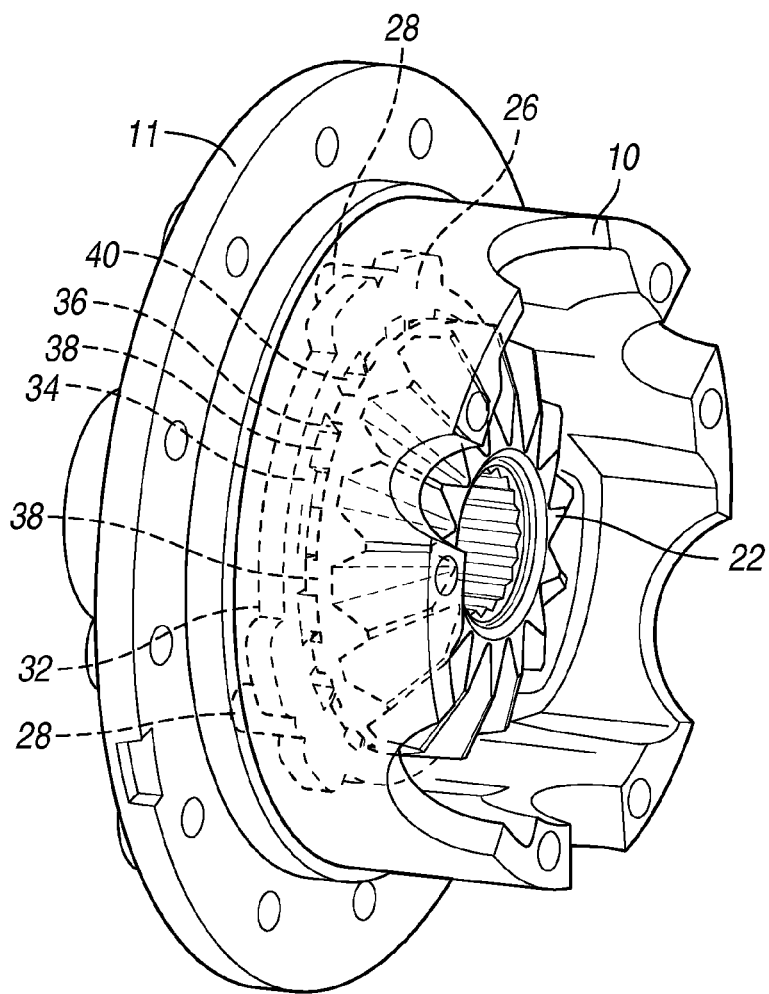
FIG. 3 is an isometric view of the case and clutch.

FIGS. 1 and 4 show a field core coil assembly 42 supported on the case 10 outside the chamber 14, the coil assembly formed with an inclined surface 90 facing an inclined surface 92 formed on case 10. The field assembly 42 includes an electromagnetic coil 44, fitted into an annular recess 46, formed in a ring 48. The coil 44 produces a magnetic field when energized with electric current through the leads 50. The field assembly is secured to the housing by brackets 52, which prevent the coil assembly 42 and coil 44 from rotating. The magnetic field produces an axial force on the coil assembly 42, whose magnitude varies with the width of an air gap 52 between the coil assembly and the case 10.

When the coil 44 is energized, it is attracted to the differential case due to the magnetic field generated by the coil. The coil assembly 42 is fixed against rotation with respect to the differential case 10, but it can translate axially toward and away from the differential case. Axial translation of the coil assembly 42 is transmitted to a sliding collar 54, which is secured to the coil assembly 42 by a press fit and an overlapping rim 58. A bushing 60, which is press fit onto the inside diameter of the sliding collar 54, allows rotation of the case with respect to the sliding collar 54 and coil assembly 42. The bushing 60 also provides a linear guide for the sliding collar 54 and coil assembly 42, allowing them to translate axially.

When the coil 44 is energized, the sliding collar 54 applies an axial force directed rightward to a roller thrust bearing 62 and an annular thrust plate 64. Bearing 62 and thrust plate 64 are located in an annular recess formed in the case. Thrust plate 64 applies axial force to the lock ring 26 through the posts 28 on the locking ring. The posts 28 extend through the axial holes 29 in web 30, causing the locking ring 26 to rotate with the case 10 and allowing the locking ring to move axially relative to the case. The post surfaces 70 are located at the left side of the web 30 adjacent the thrust plate lugs 68.

The locking ring 26 moves into mechanical engagement with the side gear 22 to prevent rotation of the side gear. Springs 80 and 82 are located adjacent to the locking ring 26 and are arranged in series such that spring 80 contacts and applies resilient force to the locking ring, and spring 82 is secured to the case 10 by a snap ring 84 and applies resilient force to spring 80. Preferably springs 80, 82 are wave springs having a corrugations directed radially from axis 12 to their radial outer peripheries, the corrugations being formed with alternating radial ridges and grooves. The springs 80, 82 are separated by a flat plate 86, located axially between the springs, such that the ridges of each spring corrugation contact the plate, thereby preventing mutual contact of the springs. The springs continually apply resilient axial force directed leftward to the locking ring 26 to oppose movement of the locking ring toward the locked position with the side gear 22 in response to the magnetic force produced by the coil 44.

When the coil current is removed, the springs 80, 82 return the locking ring 26 to the disengaged position. The force applied by the springs is sufficient to prevent inadvertent locking of the differential during normal driving conditions when the coil is deenergized. Furthermore, spring 80 has a much lower spring rate than that of spring 82, such that a nonlinear spring force curve is generated. The spring arrangement ensures that the spring force is always lower than the force applied to the locking ring 26 by coil assembly 42 when the coil 44 is energized. Since the force produced by the coil assembly 42 when coil 44 is energized is nonlinear, springs 80, 82 are selected so that the magnitude of the spring force applied to the locking ring 76 is less than the force applied by the coil assembly when energized.

The locking of differential 8 is controlled through a voltage source, coil 44 and locking ring 26. Electric current from a voltage supply, such as a battery, applied to coil 44 creates a magnetic force that actuates the locking ring 26, causing the side gear 22 to engage the differential case 10. When the electronic locker is engaged, coil 44 is cooled by the axle fluid, which directs heat, generated by the constant flow of current, away from the coil.

When a voltage is applied across the ends of coil 44 and the coil temperature increases, the electrical resistance of the coil increases and electric current in the coil decreases, i.e., current in coil 44 is inversely proportional to its temperature. Consequently, the magnetic force necessary to overcome the force produced by the locking ring return springs 80, 82 also decreases.

When the vehicle is stationary, the axle fluid flows back to a sump and the coil 44 is partially submerged in the fluid. The portion of the coil 44 that is not submerged transfers much less heat to the surrounding air than is transferred to the axle fluid, causing the coil to have a higher temperature on the portion of its surface that is not submerged in axle fluid.

When the vehicle speed is greater than zero, the entire coil 44 is cooled by the axle fluid as it splashes against and flows off of the surface of the coil.

Figure 5:
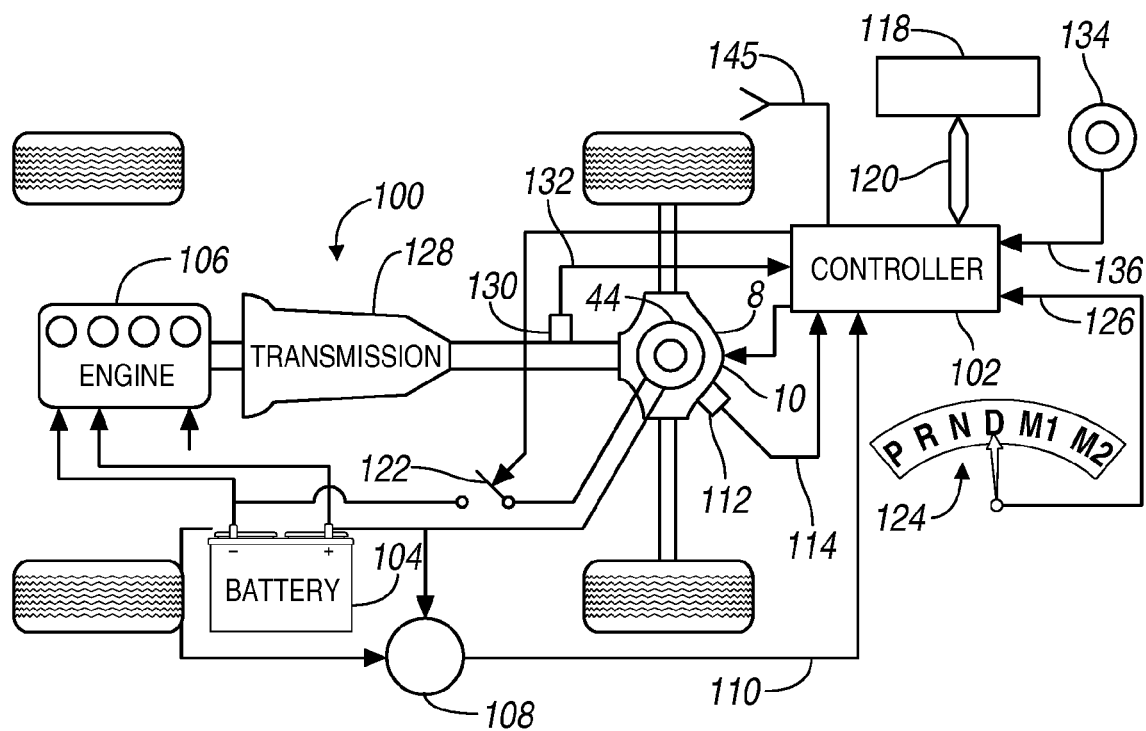
FIG. 5 is schematic diagram of a control system for the differential.
Figure 6:
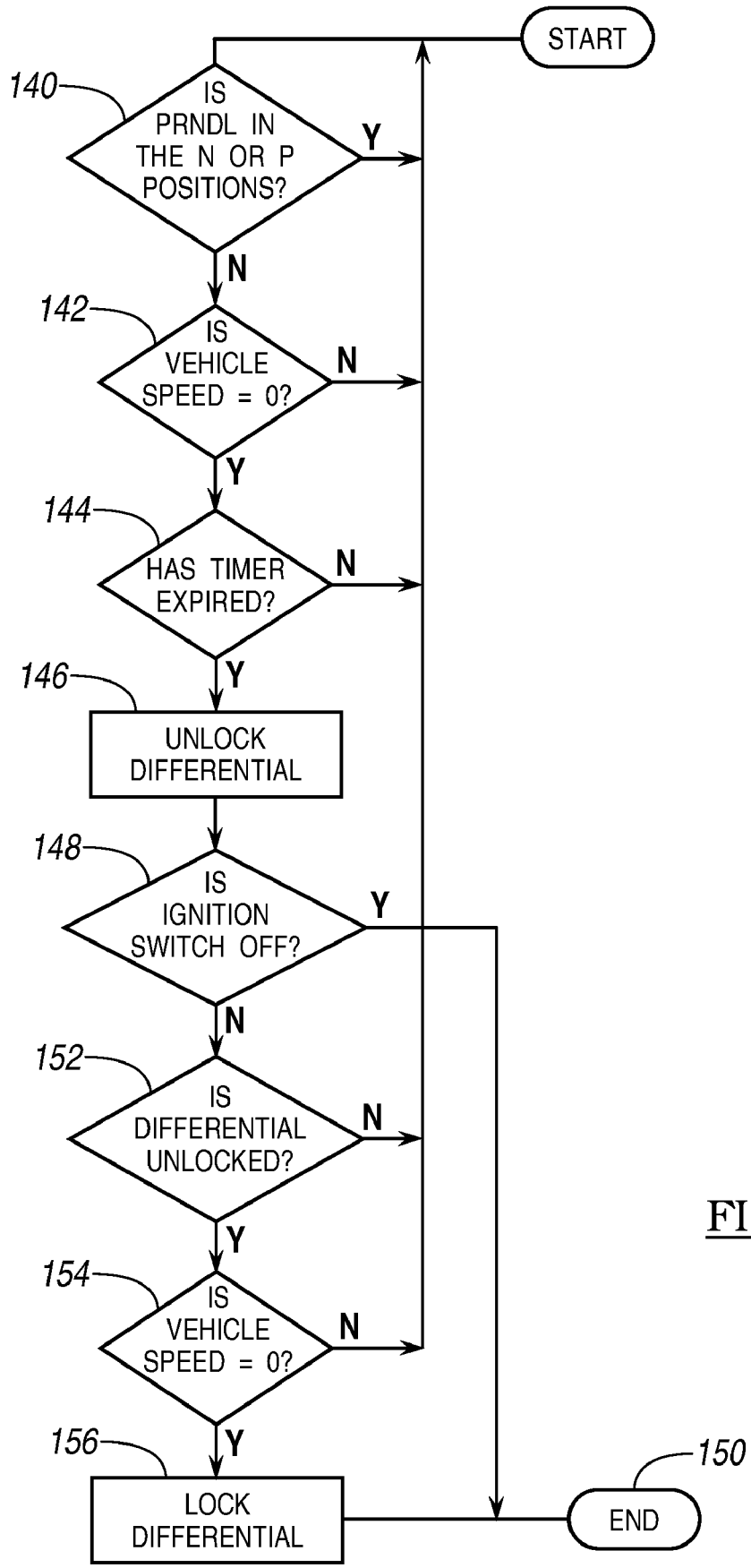
FIG. 6 is a diagram of an algorithm for controlling the locked and unlocked state of the differential.

To reduce the magnitude for electric power required to lock the differential 8 and to reduce the temperature of coil 44, the FIG. 5 illustrates a control system 100 that prevents overheating of the coil 44. System 100 includes an electronic controller 102 for actuating the locking ring 26 of differential 8. Controller 102 includes an electronic microprocessor; a timer, such as a countdown timer; and electronic memory containing a control algorithm in computer code, which algorithm is accessible to the microprocessor of the controller.

The terminals of an electric storage battery 104, such as that used to start an engine 106, are connected to a meter 108, which produces a signal 110 supplied as input to controller 102 and representing the current battery voltage. Differential 8 includes a temperature sensor 112, which produces a signal 114, supplied as input to controller 102, representing the current temperature of coil 44 or a temperature representative of the current coil temperature, such as the temperature of the axle fluid in the differential housing 10.

Controller 102 can close a switch 122, completing a circuit that connects the battery terminals to the ends of coil 44. When coil 44 is energized, locking ring 26 secures side gear 22 to case 10, locking the 1 differential 8. Controller 102 can open switch 122, thereby electrically disconnecting a battery terminal from the ends of coil 44, deenergizing coil 44, and allowing the springs 80, 82 to unlock the differential mechanism 8.

A gear selector (called a PRNDL) 124 produces a signal 126 as input to controller 102 representing the operating range of the transmission 128 that is manually selected by the vehicle operator. The ranges include P, i.e., park; R, reverse gear; N, neutral gear; D, drive range, in which each forward gear can be produced sequentially; M1, a range in which first gear is manually selected; and M2, a manually selected range in which second gear is the highest gear.

A vehicle speed sensor 130 produces a signal 132 as input to controller 102 representing the current vehicle speed. An ignition switch position sensor 134 produces a signal 136 as input to controller 102 representing the current state of the engine ignition switch.

The algorithm of FIG. 5, which is accessible to controller 102, controls the operating state of differential 8. At step 140 a test is made to determine whether the selected PRNDL position is N or P. If the result of test 140 is logically true, control returns to step 140.

If the result of test 140 is logically false, at step 142 a test is made to determine whether vehicle speed is zero. If the result of test 142 is false, control returns to step 140.

If the result of test 142 is true, at step 144 a test is made to determine whether a countdown timer is expired. Preferably the timer is set to a predetermined count when the result of test 142 is determined to be true. If the result of test 144 is false, control returns to step 140.

If the result of test 144 is true, at step 146 the differential 8 is unlocked by the controller 102 opening switch 122, thereby preventing current flow from battery 104 to coil 44. The springs 80, 82 disconnect side gear 22 from casing 11 through locking ring 26, whereupon the vehicle operator is alerted by a sensible indicator 145, such as a warning lamp or a buzzer or chime on the instrument panel, that the differential 8 cannot be currently locked.

At step 148 a test is made to determine whether the engine ignition switch is off. If the result of test 148 is true, execution of the algorithm ends at step 150.

If the result of test 148 is false, at step 152 a test is made to determine whether the differential is unlocked. If the result of test 152 is false, control returns to step 140.

If the result of test 152 is true, a test is made at step 154 to determine whether vehicle speed is greater than zero. If the result of test 154 is false, control returns to step 140.

If the result of test 154 is true, at step 156 the differential 8 is able to be locked and unlocked by the controller 102 as required. When the differential 8 is to be locked, current from battery 104 energizes coil 44 and actuates the locking ring 26 to connect side gear 22 to casing 10, thereby locking the differential.

When the vehicle is stationary, disengagement of the electronic locker lowers the electrical load on the alternator and battery 104 and prevents overheating of the coil 44 and possible breakdown of its insulation.

In accordance with the provisions of the patent statutes, the preferred embodiment has been described. However, it should be noted that the alternate embodiments can be practiced otherwise than as specifically illustrated and described.

The invention claimed is:

1. A method for controlling a locking differential for a vehicle, comprising:
    (a) using a coil and a timer to maintain the differential unlocked, if the vehicle is stationary for a period whose length is greater than a reference length set and measured by the timer;
    (b) using the coil to lock the differential, only if the vehicle is stationary for less than said reference length, or moving.

2. The method of claim 1 wherein step (a) further comprises:
    monitoring a speed of the vehicle;
    using the timer to measure the period length when the vehicle speed indicates that the vehicle is stopped;
    comparing repetitively the period length to the reference length.

3. The method of claim 1 wherein step (a) further comprises determining that a gear selector is not in a neutral or park position.

4. The method of claim 1 wherein step (b) further comprises determining that an ignition switch is off.

5. The method of claim 1 wherein step (b) further comprises determining that the differential is unlocked.

6. The method of claim 1 wherein step (b) further comprises:
    monitoring a speed of the vehicle;
    using the timer to measure the period length when the vehicle speed indicates that the vehicle is stationary;
    continually comparing the period length to the reference length.

7. A system for controlling a locking differential of a vehicle comprising:
    a mechanism for locking and unlocking the differential in response to operative states of an actuator coil;
    a controller configured to determine if the vehicle is moving or stopped; to actuate the coil and unlock the differential, if the vehicle is stopped for a period whose length is greater than a reference length; to actuate the coil and lock the differential, if the vehicle is moving or stopped for less than the reference length; to determine a temperature-dependent reference voltage at which the coil lock the differential; to determine an electric potential of the battery; to use the battery to energize the coil and lock the differential, if the electric potential is equal to or greater than the reference voltage for a current temperature; and to maintain the differential unlocked, if the electric potential is less than the reference voltage.

8. The system of claim 7 wherein the system further comprises an indicator that produces a sensible indication that the differential cannot be locked, and the controller is further configured to actuate the indicator.

9. The system of claim 7 further comprising a gear selector having multiple selectable positions, and wherein the controller is further configured to determine that the gear selector is not in a neutral or park position.

10. The system of claim 7 further comprising an ignition switch having multiple operative states, and wherein the controller is further configured to determine that the current state of the ignition switch.

11. A system for controlling a locking differential of a vehicle comprising:
    a battery;
    a timer;
    a coil for producing a magnetic field when energized by the battery;
    a mechanism for locking and unlocking the differential in response the presence and absence of the magnetic field;
    a controller configured to determine if the vehicle is moving or stopped, to control the coil and unlock the differential, if the vehicle is stopped for a period whose length is greater than a reference length ending upon expiration of the timer; and to control the coil and lock the differential, only if vehicle is stopped for less than said reference length, or moving.

12. The system of claim 11 further comprising:
    a sensor indicating a speed of the vehicle; and
    the controller is further configured to use the sensor to monitor a speed of the vehicle, to measure the period length when the vehicle speed indicates that the vehicle is stopped, and to compare repetitively the period length to the reference length.

13. The system of claim 11 further comprising an indicator that produces an indication that the differential cannot be locked, and wherein the controller is further configured to actuate the indicator.

14. The system of claim 11 further comprising a gear selector having multiple selectable positions, and wherein the controller is further configured to determine that the gear selector is not in a neutral or park position.

15. The system of claim 11 further comprising an ignition switch having multiple operative states, and wherein the controller is further configured to determine that the current state of the ignition switch.

* * * * *